United States Patent [19]

DiPoala

[11] Patent Number: 5,450,062
[45] Date of Patent: Sep. 12, 1995

[54] DETECTION SYSTEM WITH REDUCED SENSITIVITY TO PIN DIODE EFFECT

[75] Inventor: William S. DiPoala, Fairport, N.Y.

[73] Assignee: Detection Systems, Inc., Fairport, N.Y.

[21] Appl. No.: 311,622

[22] Filed: Sep. 23, 1994

[51] Int. Cl.⁶ ............................................. G08B 13/18
[52] U.S. Cl. ................................ 340/552; 340/522; 340/521
[58] Field of Search ............... 340/552, 522, 521, 553, 340/554, 565, 567, 507

[56] References Cited

U.S. PATENT DOCUMENTS

| | | | |
|---|---|---|---|
| 4,625,199 | 11/1986 | Pantus | 340/522 |
| 5,043,703 | 8/1991 | DiPoala et al. | 340/554 |
| 5,077,548 | 12/1991 | Dipoala | 340/522 |
| 5,093,656 | 3/1992 | Dipoala | 340/522 |
| 5,107,249 | 4/1992 | Johnson | 340/522 |
| 5,164,703 | 11/1992 | Rickman | 340/522 |
| 5,194,848 | 3/1993 | Kerr | 340/522 |
| 5,216,410 | 6/1993 | Pildner et al. | 340/522 |
| 5,276,427 | 1/1994 | Peterson | 340/521 |
| 5,331,308 | 7/1994 | Buccola et al. | 340/522 |

*Primary Examiner*—Jeffery A. Hofsass
*Assistant Examiner*—Benjamin C. Lee
*Attorney, Agent, or Firm*—J. Addison Mathews

[57] ABSTRACT

An intrusion detection system, including a microwave device and a light emitting diode, is controlled to alternate their operation so the diode is off and not conducting when the microwave is transmitting. During a period when the LED would otherwise be on to indicate some state of detection, it is cycled off to remove its influence from the microwave transmission and reception. The microwave transmissions are intermittent with relatively long intervals between short transmissions. The diode is switched on during the long interval and off during the transmissions, giving the appearance of a diode that it is always on. The invention has particular utility in apparatus including dual independent channels for detecting intrusion and including one or more light emitting diodes that are energized to indicate the state of one or both channels.

14 Claims, 4 Drawing Sheets

DETECTION SYSTEM WITH REDUCED SENSITIVITY TO PIN DIODE EFFECT

BACKGROUND OF THE INVENTION

1. Field of Invention

The invention relates to microwave intrusion detectors. It has particular utility in dual detector systems that include a light emitting diode for indicating a single detector alarm.

2. DESCRIPTION OF THE PRIOR ART

Many technologies are employed for detecting intrusion. Microwave and infrared devices are examples frequently used together in dual technology systems. Both devices are aimed at the same region under surveillance and detection by both devices is required for a system alarm. Dual detection reduces false alarms even when both detectors are set to a higher sensitivity than would be practical operating alone.

Typical installations of dual detector systems are based on separate channels under a common control. One channel includes an active microwave device and associated amplifiers, filters and signal processing. The other channel includes a passive infrared device with components corresponding to those in the microwave channel. Both channels are monitored by logic in the common control. Although a single channel detection might be reported, a system alarm is initiated only when both devices detect an intrusion.

Light emitting diodes (LEDs) in several colors often are energized to indicate single and dual channel detection. One color represents the microwave channel, another color the infrared channel, and a third color the combined channels. Frequently the LEDs are placed on the detector where they are visible from the region under surveillance.

PROBLEM SOLVED BY THE INVENTION

Some detector components influence electromagnetic fields in a manner that can be confused by microwave devices with signals characteristic of an intrusion. In diodes, for example, this phenomena is known as the PIN diode effect, and is particularly troublesome in light emitting diodes (LEDs) that draw relatively high current.

As noted above, LEDs may be positioned on the detector for visibility from the region under surveillance. This location is not only close to the microwave antenna but also may be in its operative field of transmission and reception. LEDs that influence the field viewed by the antenna significantly increase the probability of false alarms in the microwave channel.

In dual detector systems the PIN diode effect can substantially reduce the effectiveness of the microwave channel. Assuming, by way of example, that the passive infrared (PIR) device is first to detect an intrusion, its LED is energized to indicate a single channel alarm. If the energized LED then changes the RF field in a manner that is interpreted as an intrusion by the microwave channel, the two channels are no longer independent and the benefits of dual detection are lost.

Even a single channel microwave system can cycle through a series of false indications caused by its own LED.

SUMMARY OF THE INVENTION

The present invention is directed to overcoming one or more of the problems set forth above. Briefly summarized, according to one aspect of the invention, an intrusion detection system is controlled to extinguish a light emitting diode, or turn off other culpable solid state devices, when the microwave is transmitting. During a period when the LED would otherwise be on to indicate some state of the detecting system, it is pulsed on between transmissions and off during transmissions.

According to more specific features, the microwave transmissions are intermittent and have an interval between transmissions that is long compared to the duration of each transmission. The diode is switched on during the long interval between transmissions and off during the much shorter transmitting time. Since the on periods are much longer than the off periods, the LED appears to the human eye to be always on.

The invention has particular utility in apparatus having dual channels for detecting intrusion and including one or more light emitting diodes that are energized to indicate the state of one or both channels.

ADVANTAGEOUS EFFECTS OF THE INVENTION

Since the light emitting diode (LED), or other device producing an undesirable change in the RF field, is turned off during microwave transmission and reception, it does not contribute to false alarms. In dual channel systems, the channels operate independently to provide the full benefits of dual detection. In single channel microwave systems, the possibility of false cycling is reduced. The noted benefits are attained with a duty cycle that is controlled so the diode appears to be always on, and there is no apparent difference in the notification function normally provided by the diode.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENT

Figure 1:
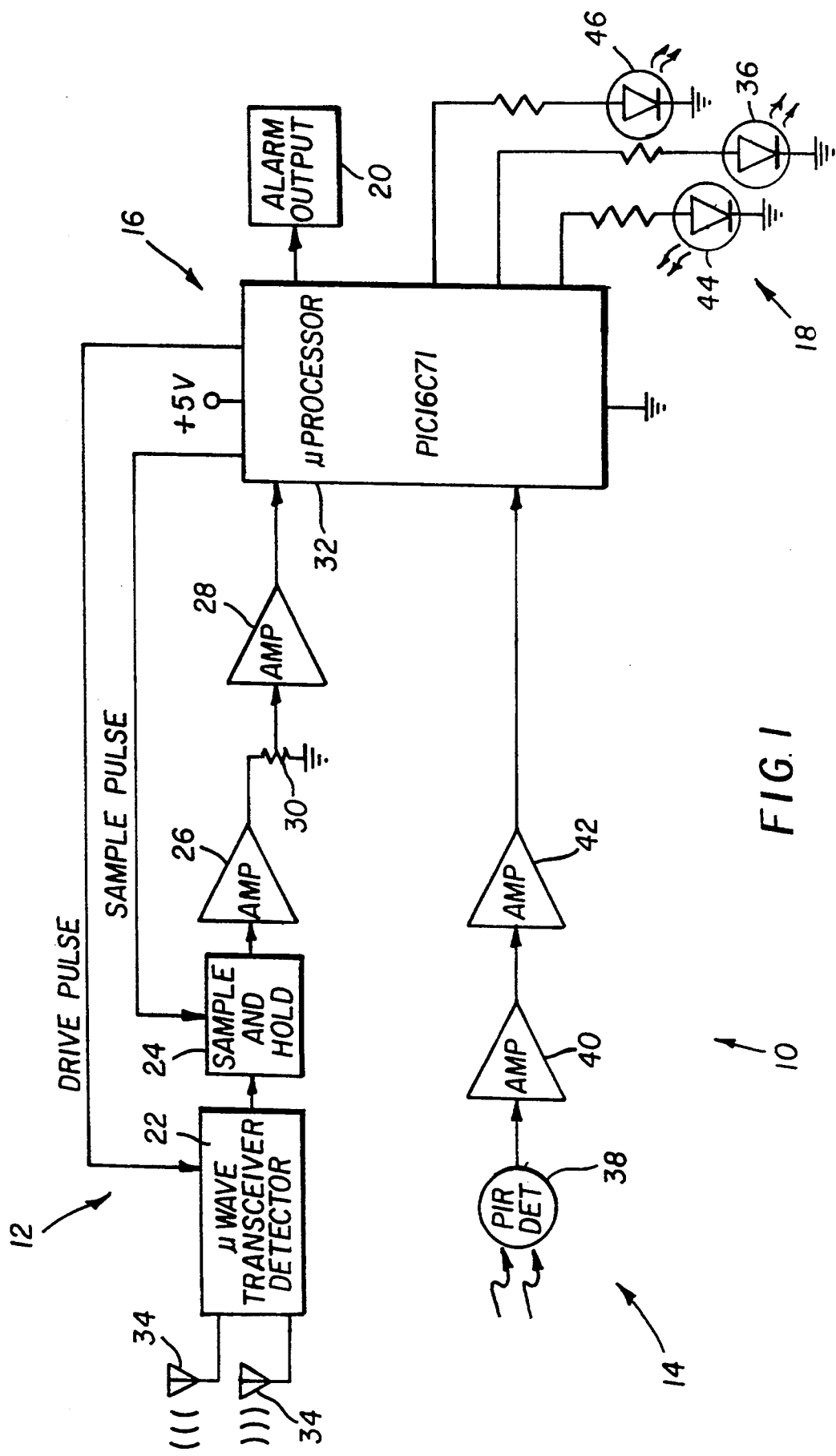
FIG. 1 is a block diagram of a dual channel intrusion detection system including a microwave detector and light emitting diode controlled according to a preferred embodiment of the present invention

Referring now to FIG. 1, a preferred embodiment of the invention is disclosed in a dual technology intrusion detection system 10. The preferred system includes a first or microwave channel 12, a second or infrared channel 14, common control logic 16, system status indicators 18, and a system alarm output 20.

Microwave channel 12 uses the Doppler effect for identifying an intrusion. A frequency shift is detected between transmitted and reflected energy caused by movement in the region under surveillance. The resulting signal is amplified and processed to determine if its characteristics are typical of an intrusion.

Infrared channel 14 uses heat. It detects infrared sources that stand out from the background and move in the region under surveillance. Again the signal is amplified and processed to determine if its characteristics represent an intrusion.

Control logic 16 provides the signal processing for both channels and monitors the results. It notes and reports single channel detection, through status indicators 18, and initiates a system alarm, through output 20, when both channels detect an intrusion within a predetermined time period.

The microwave channel 12 includes transceiver 22, sample and hold device 24, first and second amplifiers 26 and 28, adjustable resistor 30, and microprocessor 32.

Transceiver 22 includes a radiating diode and appropriate driver for-transmitting microwave energy at approximately ten and a half gigahertz (10.525 GHz). The energy is focused by antenna 34 and directed to the region under surveillance. The transmissions are intermittent, controlled by microprocessor 32, pulsing on for twenty microseconds (20 $\mu s$) every one millisecond (1 ms). Transceiver 22 also includes a mixing diode coupled to the antenna 34 for receiving energy reflected from the region under surveillance. The mixing diode detects frequency shifts or Doppler frequencies caused by movement in the region. The Doppler signal is approximately thirty one hertz for each mile per hour (31 Hz/MPH) of movement, and the mixing diode produces a time-varying output voltage having an amplitude and frequency proportional to the Doppler signal. A further description of microwave detectors is included in my commonly assigned U.S. Pat. No. 5,093,656, entitled *Active Supervision of Motion-Detection Systems*, issued Mar. 3, 1992, the disclosure of which hereby is incorporated by reference into the present specification.

Sample and hold device 24 is controlled by microprocessor 32 and takes samples of the output voltage at a one kilohertz (1 kHz) rate corresponding to the transmission pulse rate of transceiver 22. It will become more apparent from the description relating to FIG. 2 that device 24 takes samples of the transceiver output signal during transmission but for a period that starts after a transmission pulse and ends before the transmission pulse.

Amplifiers 26 and 28 are band pass amplifiers that amplify frequencies up to approximately fifty Hertz (50 Hz), filtering out other frequencies. The response time of the amplifiers also removes the individual pulses or samples to produce a signal representing the Doppler signal. Resistor 30 is adjustable to set the amplification for different installations, increasing or decreasing the sensitivity and range of microwave detection.

Microprocessor 32 processes the signals from the microwave channel, looking for amplitudes and other parameters characteristic of an intrusion, while rejecting false and spurious signals. The microprocessor reports valid single channel detection by energizing a colored light emitting diode (LED) 36 located on the front of the detector where it is visible from the region under surveillance.

Infrared channel 14 includes a passive detector 38, two amplifiers 40 and 42 and microprocessor 32. Detector 38 is a pyroelectric device positioned at the focal point of an infrared optical system (not shown) having multiple fields of view in the region under surveillance. The detector 38 senses infrared sources that are hotter or colder than the background, and particularly movement of such sources across one or more fields of view. The output of detector 38 is a voltage which is amplified at 40 and 42 and processed by microprocessor 32. The microprocessor again looks for amplitudes and other parameters characteristic of an intrusion, rejects false signals, and reports single channel detection by energizing light emitting diode (LED) 44. LED 44 is located adjacent LED 36, but is a different color, so the channel in alarm can be determined by the color of the energized LED.

As previously mentioned, the microprocessor monitors both channels 12 and 14, and initiates a system alarm through output 20 when both channels detect an intrusion. A dual alarm is indicated also by light emitting diode (LED) 46, in the same general location as LEDs 36 and 44, in a third color peculiar to a dual alarm. Of course a bi-colored LED capable of selective illumination in two or more colors will serve as well.

Antenna 34 is a flat structure forming part of a circuit board, and the LEDs 36, 44, and 46 are on the same circuit board extending in the direction of the region under surveillance. The LEDs thus are close to the antenna and its operative field. When energized, the LEDs produce what is known as a PIN diode effect. Although named after an effect in PIN diodes having two junctions between positive, intrinsic and negative layers, the term also is used in the trade and this specification to include the effect in diodes having only one junction between positive and negative layers. The PIN diode effect is an electromagnetic field having properties which may be detected by the transceiver as a Doppler signal and reported falsely as a detected intrusion. According to one scenario, a single channel alarm in the passive infrared channel 14 will energize LED 44. The resulting PIN diode effect then might be interpreted as a Doppler signal by the microwave channel 12 and reported as a microwave channel alarm. The microprocessor 32 then would see a dual alarm and might falsely initiate system alarm output 20. The two channels are no longer independent. According to another scenario, the microwave channel 12 might detect events reported as a single channel alarm that still would be rejected as a false signal by the microprocessor 32. De-energization of the microwave LED 36 might generate fields that re-trigger the microprocessor, reporting additional false alarm signals.

Figure 2:
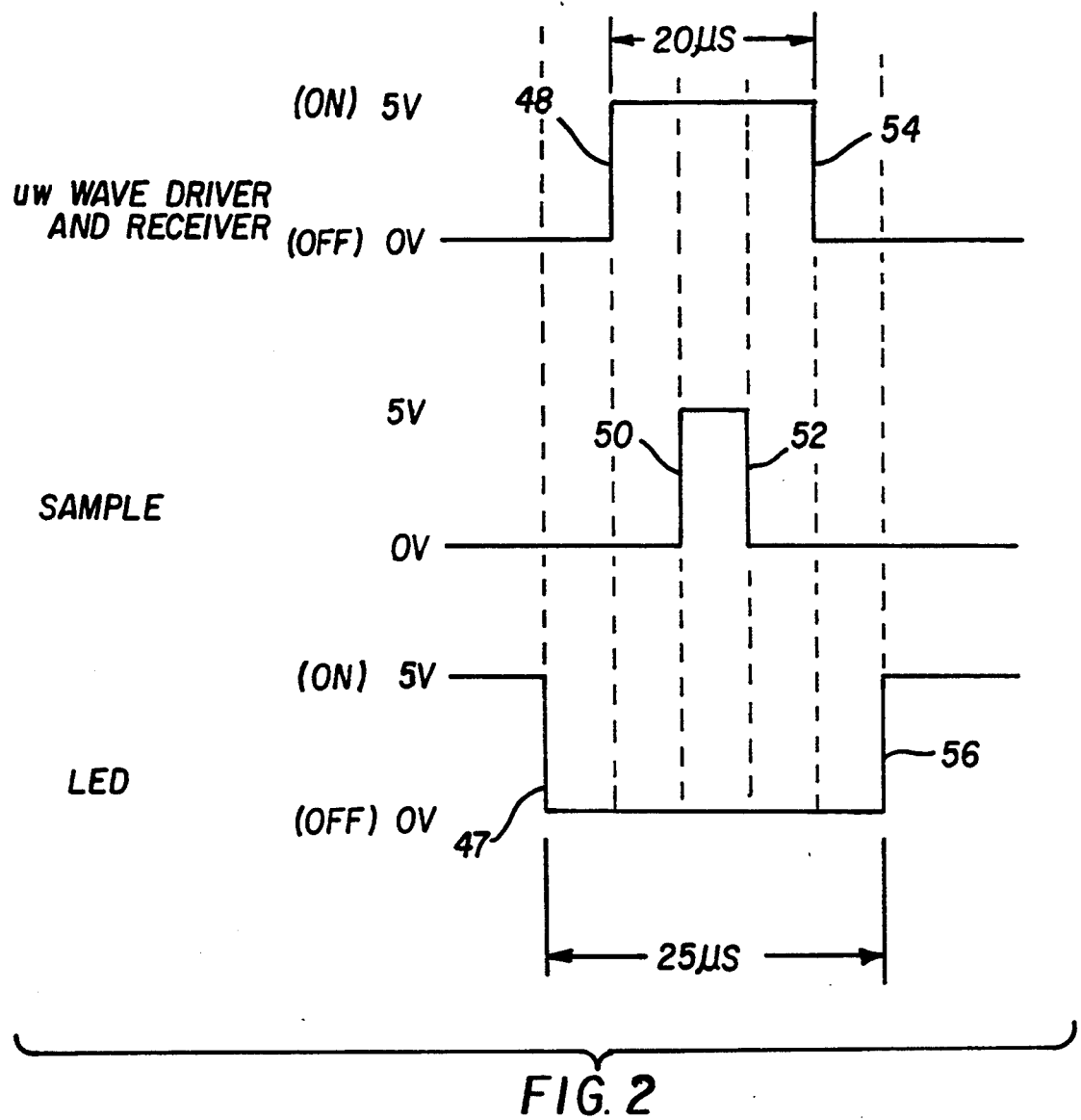
FIG. 2 is a schematic representation of the duty cycles of the microwave detector and light emitting diode of FIG. 1.

False signals, such as those described above are reduced or eliminated in accordance with the present invention by extinguishing sources of the PIN diode effect during transmission and reception in microwave channel 12. Referring to FIG. 2, the LED is turned off at 47 and is not conducting when the transceiver 22 begins transmitting and receiving at 48, or when a sample is taken by sample and hold device 24 beginning at 50. The LED remains off and not conducting until after the sample is completed at 52 and after the transmission is completed at 54. The LED is then energized again at 56. The LED is thus controlled to pulse intermittently on for relatively long periods between microwave transmissions and off for short periods during microwave transmissions.

Figure 3:
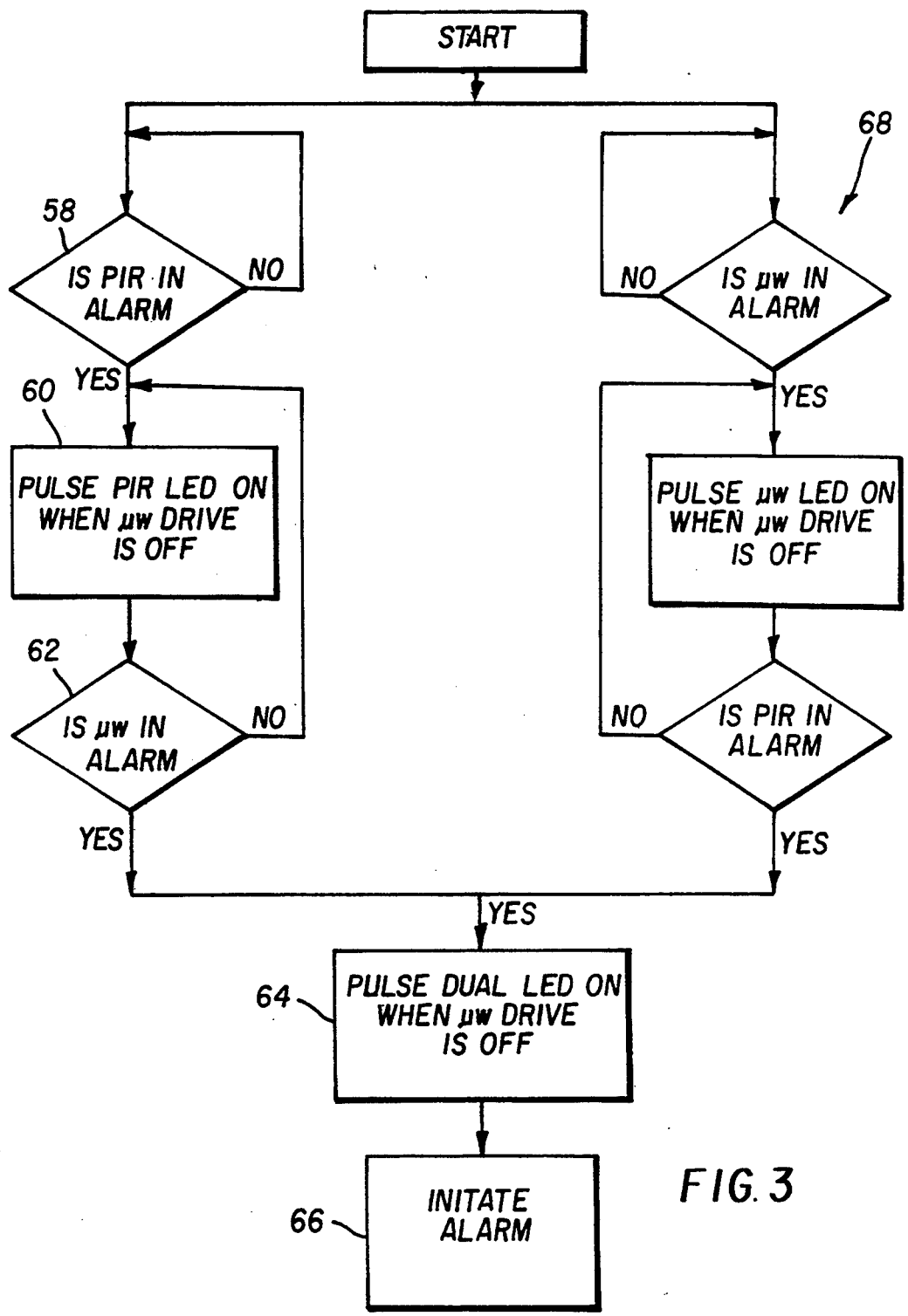
FIG. 3 is a flow diagram depicting the operation of the detection system of FIG. 1 in accordance with the preferred embodiment.

This same sequence is depicted as a flow diagram in FIG. 3. Microprocessor 32 determines at 58 if the PIR channel 14 is in alarm. If it is, and referring to box 60, the microprocessor pulses the LED 44 on, but only when the microwave driver is off. Microprocessor 32 also determines at 62 if the microwave channel 12 is in alarm. If both channels are in alarm, and referring to boxes 64 and 66, the microprocessor pulses LED 46 on, again only when the microwave driver is off, and initiates a system alarm through output 20. The microwave channel is controlled in a similar manner as indicated at column 68 of the flow diagram.

It should now be apparent that the microprocessor 32 acts as a control mechanism that switches the LEDs, or other culpable device, to conduct intermittently between the microwave transmissions and not to conduct during said microwave transmissions. Moreover, since the microwave driver is on for only a short time, twenty microseconds (20 μs) separated by relatively long intervals, one millisecond (1 ms), when it is not transmitting, the LEDs are on much longer, preferably more than thirty times longer, than they are off. To an observer looking to determine the single or dual channel alarm state, the LEDs appear to be always on.

DESCRIPTION OF AN ALTERNATIVE EMBODIMENT

Figure 4:
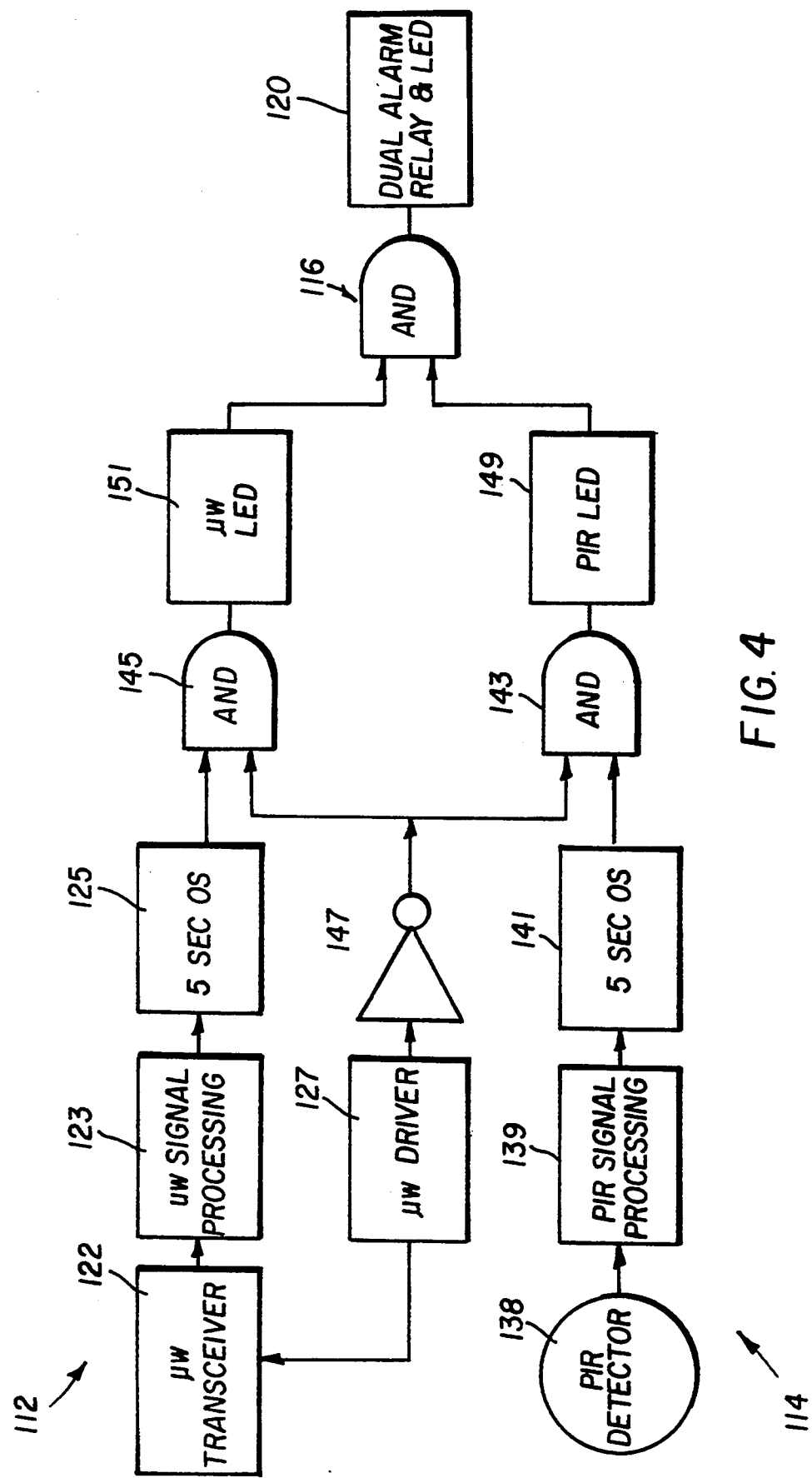
FIG. 4 is a block diagram of an alternative embodiment of the invention based on discrete components.

FIG. 4 depicts an alternative embodiment of the invention employing discrete components operating essentially in the same manner as already described.

Microwave and passive infrared channels 112 and 114, respectively, are coupled through AND gate 116 so a system alarm is initiated at 120 when both channels detect an intrusion.

Microwave channel 112 includes transceiver 122, signal processing device 123, one shot 125 and driver 127. The transceiver is operated intermittently by driver 125 to transmit and receive microwaves and detect Doppler frequencies. The Doppler signal is analyzed by signal processing device 123 to identify signals characteristic of an intrusion and reject false signals.

Passive infrared channel 114 includes detector 138, signal processing device 139 and one shot 141. Again the detector 138 detects infrared sources moving in the area under surveillance and produces a signal which is analyzed by signal processing device 139 for characteristics typical of an intrusion and rejecting false signals.

One shots 125 and 141 permit a five second or other appropriate delay to permit some interval between detections that will be considered a single intrusion.

AND gates 143 and 145 work in conjunction with NOT gate 147 to illuminate LEDs 149 and 151 to indicate single and dual channel alarms by intermittently energizing the LEDs only between microwave transmissions when the microwave driver is off.

Again, as in the preferred embodiment, the logic of the gates 143, 145 and 147 act as a control mechanism that switches the LEDs, or other culpable device, to conduct intermittently between the microwave transmissions and not to conduct during the transmissions.

While the invention is described in connection with preferred and alternative embodiments, other modifications and applications will occur to those skilled in the art. The claims should be interpreted to fairly cover all such modifications and applications within the true spirit and scope of the invention.

What is claimed is:

1. Apparatus for detecting intrusion in a region under surveillance; said apparatus comprising:
   a first intrusion detection circuit including a microwave transceiver driven intermittently to transmit microwave energy toward said region and receive microwave energy from said region, said first circuit including first processing means for detecting signals characteristic of an intrusion;
   a second intrusion detection circuit including a sensor for detecting infrared energy in said region, said second circuit including second processing means for detecting signals characteristic of an intrusion;
   a light emitting diode providing a visual indication of said detected signals in said second circuit characteristic of an intrusion; and,
   a control mechanism switching said light emitting diode to conduct intermittently in response to said second circuit detection, on to conduct at intervals between said microwave transmissions and off not to conduct during said microwave transmissions.

2. The invention of claim 1, wherein said microwave transmitter includes an antenna defining a ground plane having an active side toward said region, and said light emitting diode is on said active side of said ground plane.

3. The invention of claim 2, wherein said intermittent microwave transmissions have an interval between said transmissions that is longer compared to an intermittent one of said transmissions, and said diode switching is on longer than off, whereby said diode appears to the human eye to be steadily on in response to and during said second circuit detecting intrusion.

4. An intrusion detection system having a state anticipating an alarm and a light emitting diode providing notification of said state, said system comprising:
   an intrusion detecting circuit including a microwave transmitter, a Doppler detector, and means for operating said transmitter during said state intermittently to transmit microwave energy; and,
   a control mechanism switching said light emitting diode to conduct intermittently in response to said state, on between said microwave transmissions and off during said microwave transmissions.

5. The invention of claim 4, wherein said intermittent microwave transmissions have an interval between said transmissions that is longer compared to an intermittent one of said transmissions, and said diode is switched on longer than off, whereby said diode appears to the human eye to be steadily on in response to and during said state.

6. The invention of claim 5, wherein said diode is on at least thirty times longer than off in response to and during said state.

7. The invention of claim 5 wherein said diode is on for periods exceeding five hundred microseconds and off for periods less than fifty microseconds in response to said state.

8. An intrusion detection system including a solid state element switched between conducting and nonconducting conditions during an operating state of said system, said switching of said element producing PIN diode effects, said system comprising:
   an intrusion detecting circuit including a microwave transmitter, a Doppler frequency detector, and a driver for operating said transmitter during said state intermittently to transmit microwave energy; and,
   a control mechanism limiting said switching of said solid state element during said operating state to intervals between said intermittent transmissions, whereby said PIN diode effects are displaced in time from said transmissions.

9. The invention of claim 8, wherein said detection system detects intrusion in a region under surveillance, said microwave transmitter includes an antenna defining a ground plane having an active side toward said region, and said solid state element is on said active side of said ground plane.

10. The invention of claim 9, wherein said solid state element is a light emitting diode.

11. Apparatus having dual channels for detecting intrusion, and a light emitting diode indicating intrusion detection by one of said channels, said apparatus comprising:

A microwave transmitter and detector in one of said channels;
   a driver operating said transmitter intermittently to transmit microwave energy; and,
   a control mechanism pulsing said light emitting diode on during said indication between said transmissions and off during said transmissions.

12. The invention of claim 11, wherein said apparatus detects intrusion in a region under surveillance, said microwave transmitter includes an antenna defining a ground plane having an active side toward said region, and said light emitting diode is located on said active side of said ground plane.

13. The invention of claim 8 wherein said driver operates said transmitter to transmit microwave energy, and said control mechanism switches off said light emitting diode for periods having a duration less than fifty microseconds, thereby said light emitting diode appears to the human eye to be steadily on during said indication.

14. Apparatus for detecting intrusion in a region under surveillance; said apparatus comprising:

a first intrusion detection circuit including a microwave transmitter driven intermittently to transmit microwave energy toward said region, and a corresponding detector;
   a second intrusion detection circuit including a sensor for detecting infrared energy in said region;
   a light emitting diode indicating intrusion detection by one of said first and second circuits; and,
   a control mechanism for switching said diode during said indication, on to conduct between said transmissions and off not to conduct during said transmissions.

* * * * *